No. 821,072. PATENTED MAY 22, 1906.
L. G. M. WEST.
LUBRICATOR.
APPLICATION FILED MAR. 28, 1905.
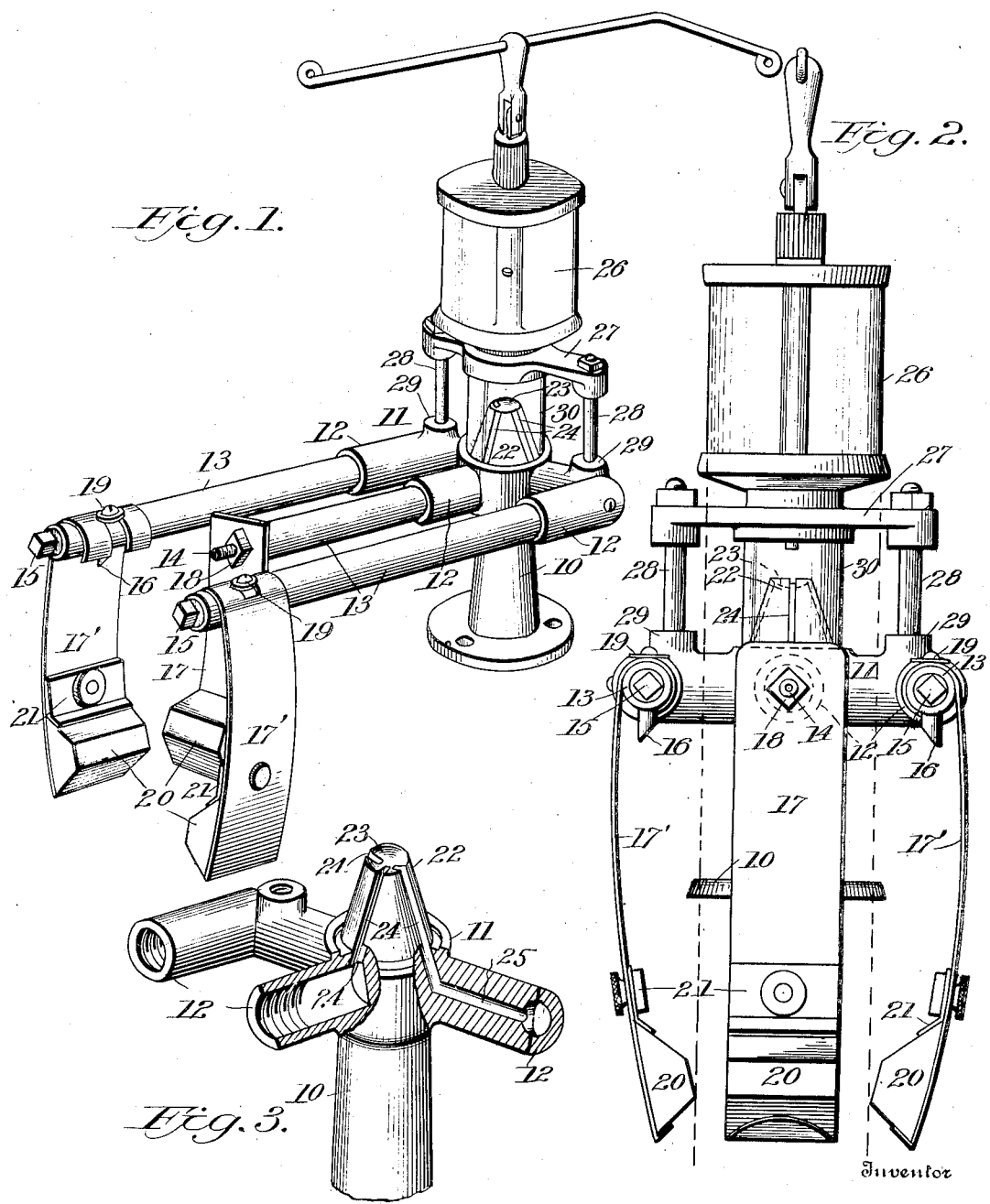

UNITED STATES PATENT OFFICE.

LOUIS G. M. WEST, OF BALTIMORE, MARYLAND.

LUBRICATOR.

No. 821,072.

Specification of Letters Patent.

Patented May 22, 1906.

Application filed March 28, 1905. Serial No. 252,519.

*To all whom it may concern:*

Be it known that I, LOUIS G. M. WEST, of Baltimore, in the State of Maryland, have invented certain new and useful Improvements in Lubricators; and I do hereby declare the following to be a full, clear, and exact description of the invention, such as will enable others skilled in the art to which it appertains to make and use the same.

This invention relates to certain new and useful improvements in lubricators, and pertains more particularly to that class of devices employed for lubricating the guides of elevators and the like.

The invention has for its object the production of a simple and inexpensive device of the character referred to by means of which the elevator-guides are constantly lubricated.

A further object is to provide means whereby the oil or other lubricant is divided and evenly supplied to the various exposed faces of the elevator-guides.

To these ends the invention will be hereinafter fully set forth, and particularly pointed out in the claims.

In the accompanying drawings, Figure 1 is a view in perspective illustrating my improved lubricator. Fig. 2 is a front elevation. Fig. 3 is a detail perspective view of the oil-distributing device, parts being broken away.

Referring to the drawings, 10 designates a base or standard adapted to be secured to the elevator, the same supporting a coupling member 11, provided with a plurality of threaded branches 12. From each of said branches leads a pipe or conduit 13, three of such pipes or conduits being shown. It will be understood, however, that this number may be increased or diminished to conform to the number of faces to be lubricated. The central pipe or conduit is shown considerably shorter in length than the other pipes or conduits and is provided with a threaded nipple 14, leading from the outer end thereof and serving to discharge the lubricant that may be contained in said pipe or conduit. The outer ends of the longer pipes or conduits are closed by plugs 15 or other suitable devices, the lubricant being discharged through suitable nipples 16. The lubricant is discharged from the pipes or conduits 13 upon distributing-plates 17 and 17', the plate 17 being provided with a hole to receive the nipple 14 and is rigidly held by a nut 18, working on said nipple. The plates 17' are slotted to embrace set-screws 19 on the longer pipes or conduits, whereby said plates are rigidly held in position. Said plates 17 and 17' are of resilient metal and provided at their lower ends with rubbing-blocks 20, of wood or other suitable material, held in position by clamps 21.

The coupling member 11 is made solid at its central portion and provided with an upwardly-extended tapering body 22, the top of which is provided with a conical cavity 23, forming a distributing-well for the lubricant. The exterior surface of the body 22 is interrupted by grooves 24, formed in the periphery of the body 22 and corresponding in number to the pipes or conduits 13 and intersecting the walls of cavity 23, the solid portion of the coupling member being provided with holes or perforations 25, whereby said grooves 24 will discharge the lubricant into said pipes or conduits. The oil-reservoir 26 is of any preferred construction and is supported by a yoke 27, mounted on standards 28, secured to bosses or enlargements 29, formed with the coupling member 11. If desired, the body 22 may be surrounded by a glass casing 30, interposed between the coupling member 11 and yoke 27, whereby dust and other foreign matters are excluded, and yet the operation of the feed is visible.

In practice the pipes or conduits 13 and the plates 17 and 17' correspond in number to the number of faces to be lubricated, the device shown in the drawings being designed to lubricate the exposed side and front faces of an elevator-guide. The oil or other lubricant is fed from the oil-reservoir 26 to the conical cavity 23 and from thence is divided by the sharp edges of the grooves 24 and conducted by said grooves to the pipes or conduits 13. From thence the lubricant is discharged upon the plates 17 and 17' and flowing down over the blocks 20 is smoothly distributed by the latter over the surfaces to be lubricated.

The advantages of my improved lubricator will be at once apparent to those skilled in the art to which it appertains. It will be particularly observed that by means of the conical distributing-cavity and the intersecting grooves the oil or other lubricant as it drops thereinto is evenly divided and a proportionate amount fed to the distributing-plate. In this manner the parts are evenly lubricated and the lubricant proportionately distributed. It will also be observed that by means of the distributing-plates the lubricant is smoothly distributed, and the blocks, in addition to spreading the lubricant, also serve to wipe dust and other accumulations from the faces which are being lubricated.

I claim as my invention—

1. A lubricating device comprising a reservoir, and a member spaced apart from and in juxtaposition with said reservoir, having its exposed end provided with a distributing-well, said well being provided with means for dividing the lubricant into a plurality of parts.

2. A lubricating device comprising a dividing member, one end of which is provided with an interrupted surface forming a plurality of spaced-apart dividing portions.

3. A lubricating device comprising a dividing member one end of which is provided with an interrupted surface forming a plurality of spaced-apart dividing portions, and means for dropping lubricant upon the end of said member.

4. A lubricating device comprising a dividing member one end of which is provided with a well, the wall of said well being interrupted to form spaced-apart dividing portions.

5. A lubricating device comprising a dividing member having one end provided with a receiving-well, and means for dropping lubricant into said well.

6. A lubricating device comprising a member provided with a conical distributing-well, said member having grooves intersecting the sides of said well, and distributing devices communicating with said grooves.

7. A lubricating device comprising a tapering member having its end provided with a conical cavity, the periphery of said member being provided with grooves intersecting said cavity, and distributing devices communicating with said grooves.

8. A lubricating device comprising a base or standard a tapering member supported thereby and provided with a conical well, grooves being formed in the periphery of said body and intersecting said well, and distributing devices communicating with said grooves.

9. A lubricating device comprising a plurality of distributing pipes or conduits, flexible plates secured thereto, and means for supplying lubricant to said pipes or conduits, the latter being provided with discharge-openings adjacent said plates.

10. A lubricating device comprising a plurality of pipes or conduits having outlet-nipples, flexible plates secured to said pipes or conduits adjacent said nipples, rubbing-blocks mounted in the lower ends of said plates, and means for supplying lubricant to said pipes or conduits.

11. A lubricating device comprising a plurality of pipes or conduits having outlet-nipples, flexible plates secured to said pipes or conduits adjacent said nipples, clamps on the lower ends of said plates, rubbing-blocks mounted in said clamps, and means for supplying lubricant to said pipes or conduits.

12. A lubricating device comprising a base or support, a coupling member supported thereby, pipes or conduits mounted in said coupling member, means for supplying lubricant thereto, and flexible distributing devices mounted upon said pipes or conduits.

13. A lubricating device comprising a base or support, a coupling member supported thereby, a tapering member mounted upon said coupling member and having a conical cavity, said member being provided with grooves intersecting said cavity, pipes or conduits mounted in said coupling member and communicating with said grooves, and flexible distributing devices mounted on the free ends of said pipes or conduits.

14. A lubricating device comprising a tapering member having its end provided with a cavity, the periphery of said member being provided with grooves which are in communication with said cavity, and distributing devices communicating with said grooves.

15. A lubricating device comprising a base, a tapering member supported thereby and provided with a well, grooves being formed in the periphery of said body which are in communication with said well, and distributing devices communicating with said grooves.

In testimony whereof I have signed this specification in the presence of two subscribing witnesses.

LOUIS G. M. WEST.

Witnesses:
FRANK P. DELAN,
THOMAS E. CROMWELL.